Figure 1:
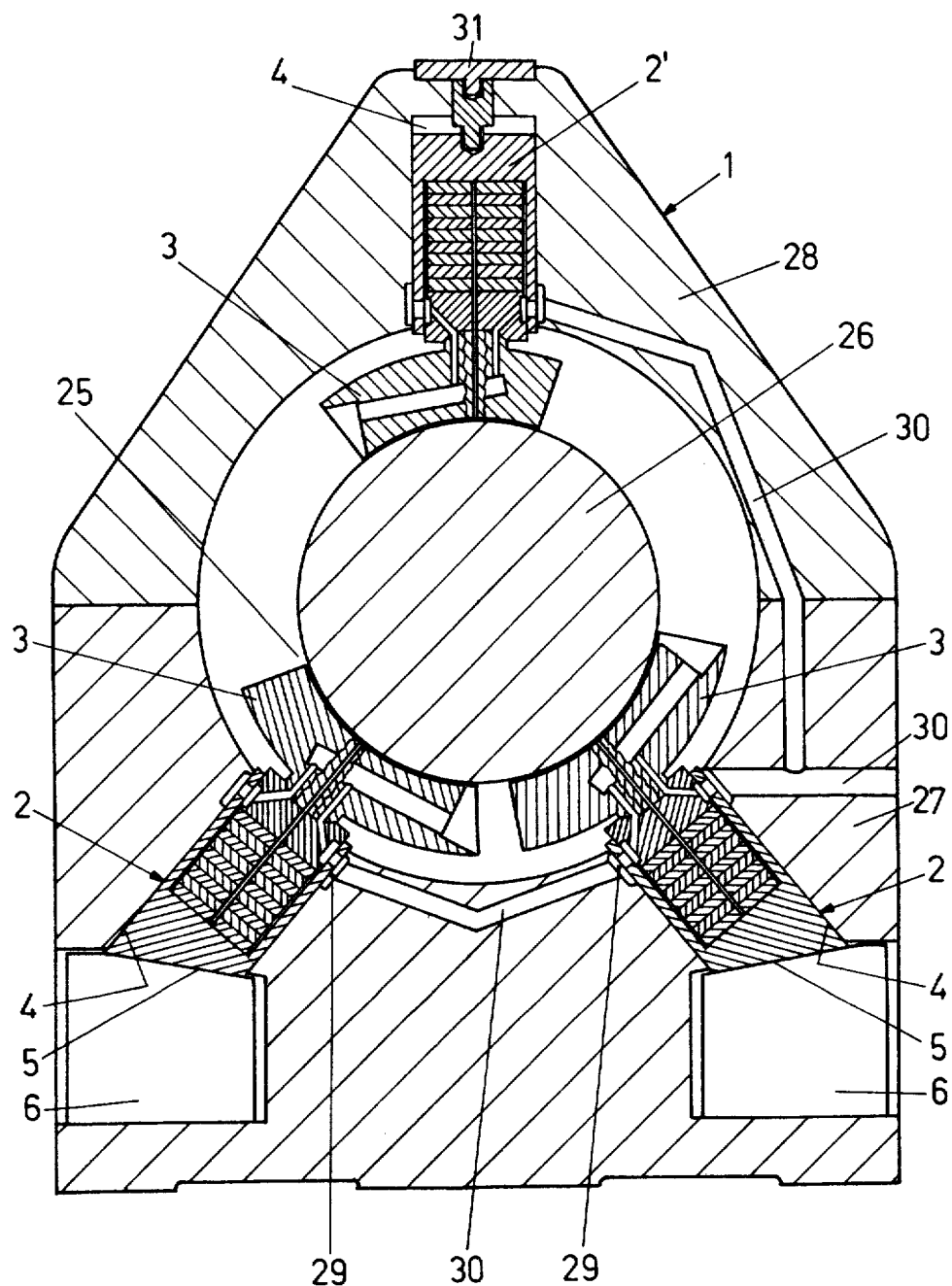

United States Patent
Hohn

[11] 3,972,572
[45] Aug. 3, 1976

[54] METHOD AND APPARATUS FOR MODIFYING VIBRATIONAL BEHAVIOR OF A ROTARY SHAFT

[75] Inventor: Alfred Hohn, Kirchdorf, Switzerland

[73] Assignee: BBC Brown Boveri & Company Limited, Baden, Switzerland

[22] Filed: Apr. 23, 1975

[21] Appl. No.: 570,630

[30] Foreign Application Priority Data
Feb. 12, 1975 Switzerland.......................... 1712/75
Apr. 30, 1974 Switzerland.......................... 5906/74

[52] U.S. Cl. ............................................... 308/73
[51] Int. Cl.[2] ........................................ F16C 17/06
[58] Field of Search............................................ 308/73

[56] References Cited
UNITED STATES PATENTS

| | | | |
|---|---|---|---|
| 2,384,589 | 9/1945 | Baldenhofer............................ | 308/73 |
| 2,718,440 | 9/1955 | Brinkmann............................ | 308/187 |
| 2,936,197 | 5/1960 | Weiler.................................... | 308/73 |
| 3,004,804 | 10/1961 | Pinkus et al........................... | 308/73 |
| 3,497,276 | 2/1970 | McGrew, Jr. et al................. | 308/73 |
| 3,502,064 | 3/1970 | Cashman et al...................... | 308/73 |
| 3,610,711 | 10/1971 | Mierley, Sr............................ | 308/73 |

Primary Examiner—M. H. Wood, Jr.
Assistant Examiner—Richard A. Bertsch
Attorney, Agent, or Firm—Pierce, Scheffler & Parker

[57] ABSTRACT

An arrangement for facilitating modification of the vibrational behavior of a rotatable shaft which is supported by a segmented type of bearing in which the bearing segment supports that have predetermined built-in elastic and damping characteristics are removable for replacement with similar supports with different elastic and damping characteristics without dismantling the bearing housing. The bearing segment supports are retained in bores provided in the wall of the bearing housing and can be removed from these bores through access openings provided in the housing.

12 Claims, 3 Drawing Figures

METHOD AND APPARATUS FOR MODIFYING VIBRATIONAL BEHAVIOR OF A ROTARY SHAFT

This invention relates to an improved method and arrangement for facilitating modification of the vibrational behaviour of a rotatable shaft which is supported by a segmented type of bearing, by making it possible to more easily change the elasticity and/or damping characteristic of the supporting structure for the bearing segment.

The proper overall design of a power plant with respect to vibrations which may arise poses a complex problem due to the large number of parameters involved. The characteristics of the sub-structure, the foundation, base slabs, mounting and rotor section play a significant role. Since the components are often supplied by several contractors, there arises a problem of coordination.

Moreover, the physical model of such structure which is subject to vibrations is so complex that simplifications must be used for the computations, with the result that the values so computed do not reflect final actual conditions. This can lead to the construction of power plants which are poorly designed from a vibration point of view, and such plants are found universal.

Whenever the rotatable shaft machine of the plant requires changes at a later time to improve its vibrational behaviour there exists practically only one remedy, this being to modify the rigidity and damping characteristics of the bearing structures for the shaft. At the present time, this involves a shut-down of the machine for extended periods of time. It becomes necessary to open up the bearing housings and to remove the rotor so that it becomes accessible to be worked on. These operations may often take weeks and will result, in the case of large-sizzed machines, in costly production stoppages. Even the final outcome will become doubtful because there is no guarantee that the repair work will be successful in solving the vibration problem.

The object of the present invention is to avoid the disadvantages of the known method of modifying the vibrational behaviour of a shaft and to establish an improved mode where it will only be necessary to shut down the machine for a short time in order to improve its vibrational behaviour, and where the results of the repair are predictable and a positive outcome will be certain.

The invention solves the problem in that the shaft is stopped, the supporting parts for retaining the bearing segments in place can be removed to the outside of the bearing housing without the necessity for uncovering and removing the shaft at the bearing housing by disassembling the housing and the bearing supporting parts being replaced with other supporting parts of like overall structure but which possess different, specifically known elasticity and/or damping factors from the one removed, thereby modifying the vibrational behaviour of the shaft.

The improved structure for pratical aplication of the new technique as proposed by the invention is distinguished by means which hold the supporting parts for the bearing segments in place within matching bores provided in the bearing housing, the entrance to these bores being easily accessible from the exterior of the bearing housing so that the bearing segment supporting parts can be easily and quickly removed from the housing and replaced with other support parts having different elasticity and/or damping characteristics.

The invention thus solves the problem of an on-site repair, often required in the case of a completed power plant for the purpose of improving its vibrational behaviour in that the originally installed bearing segment supports for the rotor shaft can be easily replaced without the need for uncovering the bearing housing and removing the shaft. The dynamic characteristics of the bearing segment support parts are always known before and can be checked individually on a test stand, so that their subsequent effects in conjunction with the shaft can be predicted in advance and a successful repair definitely assured.

Figure 2:
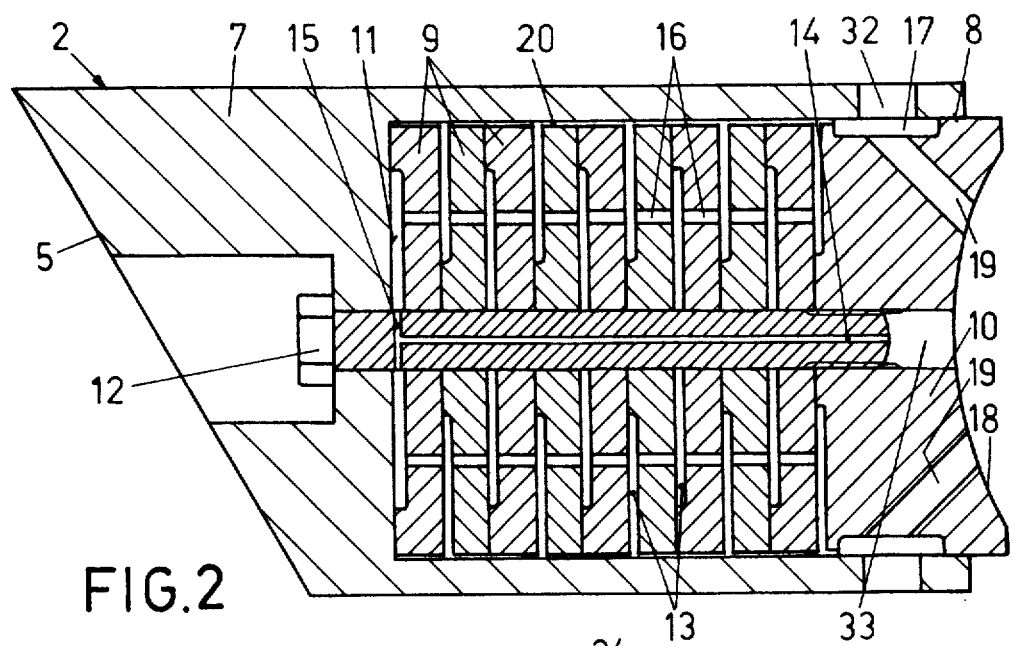
Figure 3:
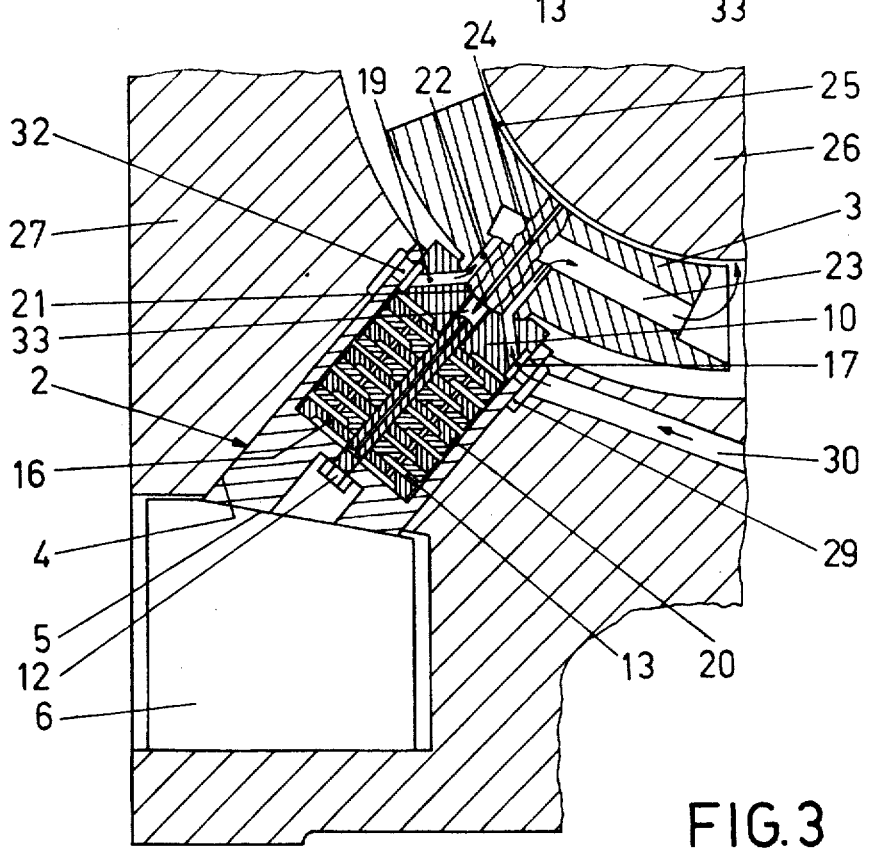

The foregoing and other objects and advantages of the invention will become more apparent from the following detailed description of a preferred embodiment and from the accompanying drawings wherein:

FIG. 1 is a transverse section through a shaft and its segmented bearing structure and housing;

FIG. 2 is a longitudinal central section through one of the bearing segment supports shown in FIG. 1 but drawn to a larger scale; and FIG. 3 is a transverse section through a portion of the entire bearing structure depicted in FIG. 1 but drawn to a somewhat larger scale and provided with directional flow arrows for the lubricating fluid delivered under pressure to the bearing segment and also to the bearing support which contains the elastic and hydraulic damping structures which affect the vibrational behaviour of the shaft.

The segmented structure illustrated in FIG. 1 which supports, for example, a section of a steam turbine unit includes a bearing housing 1 which consists of a lower portion 27 and an upper portion 28 joined together along a horizontal divider plane. A system of interconnecting fluid passageways 30 provided within the body of the bearing housing structure functions to deliver the lubricating fluid to the bearing segments for lubricating the surface of the shaft 26 at the gaps 25 and also for damping the shaft vibrations.

Located within the bearing housing are three cylindrical bores 4 within which are slidably received the three cylindrical supports 2,2' which carry the three bearing segments 3 arranged about the periphery of the shaft 26. Two of these bearing segment supports 2,2 are located in the lower portion 27 of the bearing housing and the third bearing segment support 2' is located in the upper portion 28. The bores 4 include annular grooves 29 which communicate with the internal fluid passageways 30 for distribution of the lubricating and damping fluid to the bearing segment supports 2,2'.

The two lower bearing segment supports 2 each have their bottom faces 5 angled off for engagement with the tapered face of a wedge member 6 so that when the members 6 are forced into their recesses provided in the body of the housing portion 27, the cylindrical supports 2,2 are forced radially in the direction of the shaft 26. These wedge members 6 can be removed from the housing portion 27 which then permits the bearing segment supports 2 to be removed from the outside. The radial adjustment of the supports 2 enables one to properly center the three bearing segments 3 relative to the rotational axis of the shaft 26.

In lieu of the illustrated arrangement for effecting radial displacement of the bearing segment supports 2, it is possible to provide a threaded connection between the supports 2 and bores 4, or to hold a bottom face of the supports 2 in position by means of a fastening part which is screwed into the bore 4.

As will now be understood from the described arrangements for mounting the two supports 2 within the bores 4, these supports can be removed on-site and exchanged without the necessity for opening up the housing 1 surrounding the shaft. It thus becomes possible in the case of a required repair to quickly remove the bearing segment supports 2,2 in the event that shaft vibrations arise as a result of their elasticity and/or hydraulic damping factors and to replace them with other supports, selected on the basis of different elasticity and/or damping factors as needed in order to correct the vibrational shaft behaviour.

The support 2' for the upper bearing segment 3 which is accommodated in the bore 4 of the upper bearing housing part 28 has essentially the same structure as the two lower supports 2,2 and functions principally as an amplitude limiter for the shaft vibrations. Since its elasticity and damping factors have no influence on the vibrational behaviour of shaft 26, it need not be removed and hence its interchangeability from the outside of the bearing housing 1 is not a necessity. Therefore, it can be inserted within its bore 4 from the inside when the upper housing part 28 is removed. The threaded pin 31 which engages the end face of the support 2' enables one to adjust and set the support 2' within its housing part 28 without the necessity for disassembling the housing.

As shown more clearly in the larger scale view of FIG. 2, each bearing segment support 2 is provided with an internal elastic structure characterized by a spring constant — for imparting a radial spring movement by the bearing segment 3 — and a hydraulic damping device characterized by a damping constant — for attenuating the radial displacement by the bearing segment. The elastic structure is formed by a stack of disc type springs 9 located within a cylindrical blind bore 8 provided in the cylindrical block 7. At the inner end of the spring stack 9 there is located an open socket 10 which is movable longitudinally within the bore 8. The socket 10 and the stack of disc springs 9 are secured together by means of a draw bolt 12 which passes through the centers of the springs 9 and is threaded into a central opening 33 through the socket 10. The head of the draw bolt 12 is located in a recess provided in the bottom face 5 of the cylindrical block 7 and hence is accessible for tightening so that the disc springs 9 are drawn down against each other and against the bottom of the blind bore 8. Gaps 13 which are provided between the faces of adjacent disc springs 9 as a result of their profiles permit the springs 9 to move relative to each other, the springs functioning as cup type spring elements. The spring constant which characterizes the elastic component of each bearing segment support 2 is controlled to a large extent by the number of spring discs 9 included in the stack, by their configuration and dimensions. However, lubricating fluid which is present in the spaces 13 during operation of the shaft has likewise a considerable influence on the spring constant.

The damping structure which functions hydraulically comprises a system of hydraulically interconnected flow paths through which the fluid used for lubricating the bearing segments can flow. The draw bolt 12 includes one passageway 15 extending transversely through it adjacent the bottom of the blind bore 8 in the cylindrical block 7 and another passageway 14 extending axially through the bolt and terminating at its junction point with the transverse passageway 15. These two passageways form one flow path for the fluid which communicates with the spaces 13 between adjacent spring discs 9 by way of passageways 16 which pass through the discs 9 and intersect the spaces 13. The spaces 13 communicate with a leakage chamber 20 formed between the periphery of the stack of spring discs 9 and the surface of the blind bore 8, this chamber being hydraulically connected with an annular channel 17 formed at the periphery of the socket 10. Between the leakage chamber 20 and the annular channel 17 there is located a throttle point, which is not illustrated. It serves to bank up the fluid flowing from the support 2 in such manner that the fluid pressure within the support 2 will only be slightly lower than the fluid pressure within the lubricating gap 25 between the surface of shaft 26 and the surface of the bearing segment 3. This measure is necessary because the volume of the fluid, according to Young's modulus of elasticity, is strongly influenced by the pressure level and air content. The annular channel 17 communicates with an annular channel 29 provided in the housing part 27 by way of apertures 32 which extend through the wall of the cylindrical block 7.

The socket member 10 includes a spherically concave surface 18 for supporting the bearing segment 3. Two or more channels 19 located within the socket 10 and which communicate with the annular channel 17 extend at an angle to the axis of the support 2 and lead to the concave surface 18.

The damping factor which characterizes the damping component of the support 2 is primarily controlled by the total hydraulic resistance to fluid flow through the support 2. The diameter of the passages 16, the axial width of the spaces 13 between the spring discs 9, and the radial width of the annular leakage chamber 20 constitute parameters which have significant influence on the damping factor.

Each bearing segment 3 includes a spherically convex surface 21, as more clearly depicted in FIG. 2 which engages the spherically concave surface 18 of the socket member 10 when the support structure 2 is in its installed position in the bore 4 of support 2, i.e. the position depicted in the drawings. Each bearing segment 3 also includes passageways 22 which extend through it in alignment with the passageway 19, and communicate with another passageway 23 which terminates at the leading edge of the bearing segment 3 for delivering the lubricating fluid under pressure to the gap 25 between the shaft and bearing surfaces. Each bearing segment 3 also includes a centrally located passageway 24 which communicates with the channel 14 in draw bolt 12 via the passageway 33 through the center of the bearing socket 10 and extends through the latter of the center of the bearing gap 25.

FIG. 3 illustrates clearly by use of directional flow arrows the manner in which the supports 2 operate in conjunction with the bearing segments 3 and shaft 26. Lubrication fluid flows from a pump, not illustrated, into that passageway 30 which extends into the body of the bearing housing part 27 from the outside and from there by way of the annular channel 29, the annular channel 32, the annular channel 17, dual passageways 19 and the passageways 22, 23 in the bearing segment 3 into the bearing gap 25 thus providing there in a reliable manner the lubrication necessary for the bearing surface portions of the shaft. The lubricating fluid flows from the center of gap 25 at a high pressure back through the passageway 24 in the bearing segment 3 into the central passageway 33 through the socket member 10, and from there by way of the passageways 14, 15 through draw bolt 12 and the passageways 16 in the spring discs 9 into the spaces 13 between adjacent spring discs, and thence radially outward through the spaces 13 into the surrounding leakage chamber 20. From chamber 20, the fluid continues its flow by re-entering annular channel 17 and returns, along with incoming fresh fluid by way of the passageways described to the leading edge of the bearing segment 3.

The lubricating fluid which flows through the support part 2 attenuates, due to the working compression to which it is subjected, radial movements of the bearing segment 3 and eliminates the damping heat thereby generated. The radial movements of the bearing segment 3 are resilient due to movement of the stacked spring discs 9 which take place relative to each other. However, these movements are attenuated also to a considerable extent by the damping function inherent in fluid which flows through the entire elastic structure embodied within support part 2, whereby the elasticity and damping factors are determined by the geometry and dimensions of the components which make up each calibrated bearing segment support part 2. The availability of such calibrated support parts which can be made ready for installation and which differ by a variety of specific and known elasticity and/or damping factors thus makes it possible to modify the elasticity and/or damping factors of a segmented type of bearing in a much shorter time than has been possible heretofore and thus influence the vibrational behaviour of the shaft in a predictable manner.

I claim:

1. A bearing structure of the segmented type for supporting a rotatable shaft which comprises a housing enclosing a section of the shaft and which includes a plurality of bearing segments distributed about the periphery of the shaft section, said bearing housing including a plurality of internal bores similarly distributed about the periphery of the shaft, bearing segment supports mounted in said bores, said bearing segment supports including a blind bore, a stack of disc-type springs mounted in said bore which determine the vibrational behaviour of the shaft, a socket member for the bearing segment slidably mounted in the entrance to said bore in contact with the corresponding end of said spring stack, means for pressing one face said socket member against the spring stack to place the latter under compression against the bottom of said bore, and access openings in said bearing housing to said internal bores whereby the corresponding bearing segment supports may be removed and replaced with other similarly constructed supports but which have a different elastic characteristic therby effecting a correspondingly modified vibrational behaviour of the shaft.

2. A bearing structure as defined in claim 1 wherein said bearing segment supports which are inserted into the internal bores provided in the bearing housing have angled-off bottom faces engageable with a wedge member for retaining the bearing support in its bore.

3. A bearing structure as defined in claim 2 wherein said means for pressing said socket member against the spring stack is constituted by a draw bolt which passes through the bottom of the blind bore and through the spring stack and is screwed into the socket member.

4. A bearing structure as defined in claim 1 wherein said disc-type springs function as cup springs and are so profiled as to provide spaces therebetween in order to permit relative movement between adjacent spring discs.

5. A bearing structure as defined in claim 1 wherein said disc-type springs function as cup springs and are so profiled as to provide spaces therebetween in order to permit relative movement between the spring discs, and means establishing an internal system of flow paths within said blind bore and between said spring discs through which a fluid for lubricating the shaft section flows into and out of said segment support to provide hydraulic damping.

6. A bearing structure as defined in claim 5 wherein said internal system of flow paths for the lubricating fluid includes a path connecting the opposite face of said socket member with the spaces provided between said spring discs.

7. A bearing structure as defined in claim 5 wherein said internal system of flow paths for the lubricating fluid includes a bore extending longitudinally through a draw bolt which joins a transverse bore through the bolt, said bolt constituting the means for pressing said socket member against said spring stack.

8. A bearing structure as defined in claim 5 wherein said internal system of flow paths for the lubricating fluid includes passageways through said stack of spring discs and which communicate with and interconnect the spaces between adjacent discs.

9. A bearing structure as defined in claim 5 and which further includes an annular channel provided at the periphery of said socket member for admitting the lubricating fluid, a curved base surface formed at the opposite face of said socket member for engaging a complementary curved surface of the bearing segment, and a plurality of bores which communicate with said annular channel and lead to said base surface in alignment with bores extending through said bearing segment for admitting the lubricating fluid to the shaft surface.

10. A bearing structure as defined in claim 9 and wherein an annular leakage chamber is provided between the periphery of said spring stack and the surface of the blind bore in said bearing segment support, said leakage chamber communicating with the spaces between adjacent spring discs and said annular channel at the periphery of said socket member.

11. A bearing structure as defined in claim 9 and wherein each bearing segment includes a bore extending from the lubricating gap existing between the bearing segment and the shaft surface and which communicates with and supplies fluid to the flow paths provided in the bearing segment support for providing the hydraulic damping.

12. The method for on-site modification of the vibrational behaviour of a rotatable shaft supported at a plurality of locations about its periphery by means of a segmented bearing and wherein the bearing segments are carried respectively by supports mounted in the bearing housing, which comprises the steps of:
stopping the shaft,
removing a first set of bearing segment supports from the outside through a wall in the bearing housing without uncovering and removing the shaft,
replacing the first set of bearing segment supports with a second set of bearing segment supports having a predetermined built-in elastic and/or damping characteristic but which is different from that of the first set whereby the shaft will now have a different vibrational behaviour, and
re-starting the shaft.

* * * * *